(12) United States Patent
Bhuiyan et al.

(10) Patent No.: US 11,828,640 B1
(45) Date of Patent: Nov. 28, 2023

(54) METHODS AND ALGORITHMS FOR LIQUID LEVEL MEASUREMENT

(71) Applicant: Simmonds Precision Products, Inc., Vergennes, VT (US)

(72) Inventors: Yeasin Bhuiyan, Vergennes, VT (US); Peter J. Carini, Williston, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 17/813,331

(22) Filed: Jul. 18, 2022

(51) Int. Cl.
*G01F 23/18* (2006.01)
*G01F 23/16* (2006.01)

(52) U.S. Cl.
CPC ............ *G01F 23/164* (2013.01); *G01F 23/18* (2013.01)

(58) Field of Classification Search
CPC .............................. G01F 23/164; G01F 23/18
See application file for complete search history.

(56) References Cited

U.S. PATENT DOCUMENTS

| 6,925,869 B2 * | 8/2005 | Senibi ................ G01F 23/2962 73/644 |
| 11,231,311 B2 * | 1/2022 | Heim ..................... G01N 29/02 |
| 2016/0320226 A1 * | 11/2016 | Schaefer ............ G01F 23/2965 |
| 2020/0262576 A1 * | 8/2020 | Furgiuele ............... B64D 37/00 |

* cited by examiner

*Primary Examiner* — Jamel E Williams
(74) *Attorney, Agent, or Firm* — Locke Lord LLP; Gabrielle L. Gelozin

(57) ABSTRACT

In accordance with at least one aspect of this disclosure, a method for measuring a liquid level in a liquid container includes, emitting one or more guided waves from a guided wave sensor array through a liquid volume within a liquid container, the guided wave sensor array coupled to the liquid container, detecting the one or more guided waves with at least one of the guided wave sensor array or a second guided wave sensor array, and determining a liquid level of the liquid container using the one or more detected guided waves.

18 Claims, 7 Drawing Sheets

METHODS AND ALGORITHMS FOR LIQUID LEVEL MEASUREMENT

TECHNICAL FIELD

The present disclosure relates to fuel and liquid level measurement.

BACKGROUND

Traditional liquid level measurement systems and methods, such as those used for measuring fuel quantity, tend to be invasive, where most of their components are internal to a tank or other receptacle containing a liquid. In certain applications, such as jet fuel applications, this internal arrangement may be subjected to all hazards (corrosiveness, flammability) associated with the jet fuel.

In jet fuel tank applications, traditional liquid level measurement systems and their associated sensors tend to become clogged with the organic substances in the jet fuel. In some cases, existing systems require electrical energy to be injected into the system, which increases the risk of a spark, or an unwanted ignition scenario.

The conventional techniques have been considered satisfactory for their intended purpose. However, there is a need for improved liquid level measurement systems and methods having increased reliability and intrinsic safety. This disclosure provides a solution for this need.

SUMMARY OF THE INVENTION

In accordance with at least one aspect of this disclosure, a method for measuring a liquid level in a liquid container includes, emitting one or more guided waves from a guided wave sensor array through a liquid volume within a liquid container, the guided wave sensor array coupled to the liquid container, detecting the one or more guided waves with at least one of the guided wave sensor array or a second guided wave sensor array, and determining a liquid level in the liquid container using the one or more detected guided waves.

In certain embodiments, the method can include, determining an attenuation amount of the one or more detected guided waves between the one or more guided wave sensor arrays. In certain such embodiments, determining the liquid level in the liquid container can further include correlating the attenuation amount of the one or more detected guided waves to a liquid level to determine the liquid level in the liquid container.

In certain embodiments, the method can further include, deriving a new mode condition of the one or more detected guided waves and determining the liquid level in the liquid container can further include determining the liquid level in the liquid container based at least in part on the new mode condition for the one or more detected guided waves. In certain such embodiments, deriving the new mode condition can include, calculating a guided wave potential in the structure for one or more waves $\varphi$, $\psi$ of the one or more detected guided waves, represented by $\varphi=\varphi(x)e^{i(\xi_y y-\omega t)}$ and $\psi=\psi(x)e^{i(\xi_y y-\omega t)}$.

Deriving the new mode condition can include calculating a pressure wave potential $\varphi_f$ of the liquid in the liquid container at a given liquid level between a full level and an empty level, represented by $\varphi_f = Ce^{i\xi_x x}e^{i(\xi_y y-\omega t)}$, where C is a constant for the pressure wave potential, and generalizing the pressure wave potential to derive a pressure potential in the liquid, represented by $\varphi_f = Ce^{i\xi_x x}e^{i(\xi_y y-\omega t)}$. Deriving the new mode condition can further include calculating a wave number of one or more of the one or more detected guided waves, represented by $$\xi_f = \sqrt{\xi_x^2 + \xi_y^2}.$$

Deriving the new mode condition can further include calculating one or more stress fields to derive one or more boundary conditions. Calculating can include correlating the wave number with a circular frequency and pressure wave speed of the one or more detected waves at the given liquid level, represented by $$\xi_f = \frac{\omega}{c_f},$$

and deriving a stress condition an for the empty level and for the given liquid level between the full level and the empty level. The circular or angular frequency ($\omega=2\pi f$) can be deduced from the frequency (f) in Hz. The one or more boundary conditions can include for the empty level $\sigma_n=0$, at $$x = \pm\frac{h}{2}$$

and y<(F−d); and for the given liquid level between the full level and the empty level $\sigma_n=0$, at $$x = -\frac{h}{2}$$

and y<F; $\sigma_n=0$, at $$x = +\frac{h}{2}$$

and y<(F−d); $\sigma_n=-P(d)$, at $$x = +\frac{h}{2}$$

and y>(F−d), where $\sigma_n$ is normal stress, F is the total depth of the liquid at the full level, d is the liquid level, P(d) is hydrostatic pressure of the liquid in the container, and h is the thickness of the container wall. The manipulation of these boundary conditions yields to characteristic transcendental equations in terms of wave numbers. The solutions to these transcendental equations clearly show the emergence of a new guided wave mode.

Determining the liquid level in the liquid container can further include generating a dispersion plot for one or more of the detected waves in the new mode condition to determine a phase velocity and a group velocity of the one or more waves in the new mode condition.

Determining the liquid level in the liquid container can further include correlating an amplitude of the one or more detected guided waves in the new mode condition to an amplitude of the one or more detected guided waves as detected by the one or more sensor arrays to determine a first measurement of the liquid level of the liquid container.

In certain embodiments, determining the liquid level in the liquid container can include deriving a new mode condition as described above, and can further include determining an attenuation amount of the one or more detected guided waves between the one or more guided wave sensor arrays and correlating the attenuation amount of the one or more detected guided waves to a liquid level to determine a second liquid level measurement.

In certain such embodiments, determining the liquid level in the liquid container further includes comparing the first measurement of the liquid level to the second measurement of the liquid level, and calculating a percent difference between the first measurement and the second measurement. In such embodiments, determining the liquid level in the liquid container can further include, if the percent difference between the first measurement and the second measurement is greater than a predetermined threshold, the method further includes recalculating the first measurement and the second measurement, or if the percent difference between the first measurement and the second measurement is less than or equal to the predetermined threshold, determining the liquid level of the liquid in the liquid container further includes averaging the first measurement and the second measurement.

In embodiments, emitting the one or more guided waves and detecting the one or more guided waves can include emitting and detecting in a pitch-catch manner. In certain embodiments, emitting the one or more guided waves and detecting the one or more guided waves can include emitting and detecting in a pulse-echo manner.

In accordance with at least one aspect of this disclosure, a system for determining liquid level in a liquid container can include one or more guided wave sensors operatively coupled to the liquid container configured to emit and detect one or more guided waves through a liquid volume within the liquid container. In certain embodiments, the liquid container can include a fuel tank and the liquid can include liquid fuel. In embodiments, the system can include a controller operatively connected to the one or more guided wave sensors configured to receive sensor data from the one or more guided wave sensors and determine the liquid level of the container based at least in part on the sensor data.

In embodiments, the one or more guided wave sensors can include a transmitter array and a receiver array, wherein the transmitter array and the receiver array are arranged in a pitch-catch and/or a pulse-echo arrangement relative to one another. The sensor data can include an attenuation amount of the one or more detected guided waves between the transmitter array and the receiver array and a new wave mode condition of the one or more detected guided waves, The controller can be further configured to correlate an amplitude of the one or more detected guided waves in the new wave mode condition to an amplitude of the one or more detected guided waves in a non-new wave mode condition to determine a first liquid level measurement and correlate the attenuation amount of the one or more detected guided waves in a non-new wave mode condition to a liquid level to determine a second liquid level measurement. The controller can be further configured to compare the first liquid level measurement to the second liquid level measurement and calculate a percent difference between first measurement and the second measurement.

If the percent difference between the first measurement and the second measurement is greater than a predetermined threshold, the controller can be configured to recalculate the first measurement and the second measurement, or if the percent difference between the first measurement and the second measurement is less than or equal to the predetermined threshold, the controller can be configured to average the first measurement and the second (or subsequent) measurement (e.g. rolling average).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
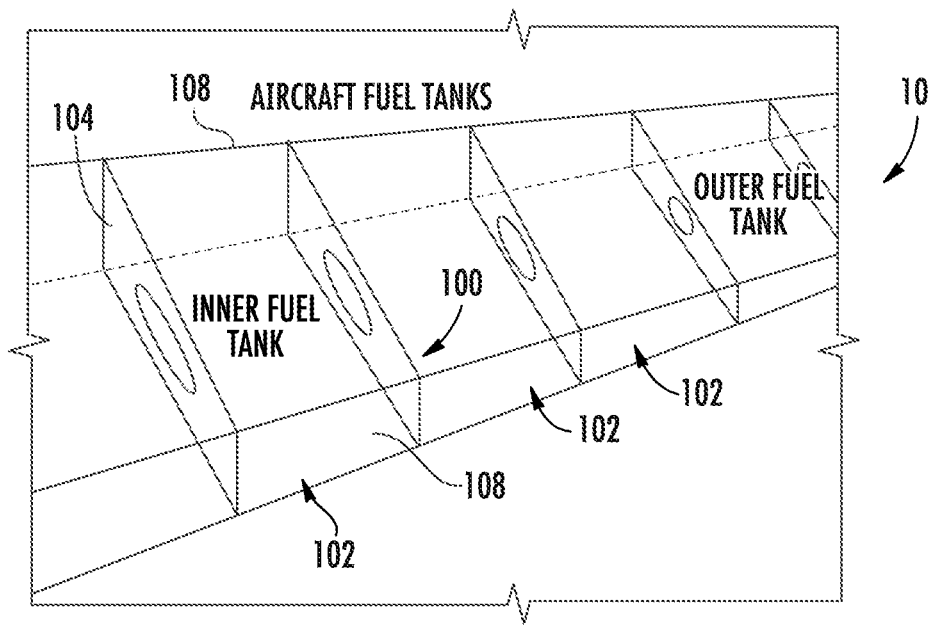
FIG. 1 is a schematic depiction of an aircraft jet fuel tank assembly having a jet fuel level measurement system constructed in accordance with embodiments of the present disclosure, showing a plurality of receptacles in direct abutment with one another.

Reference will now be made to the drawings wherein like reference numerals identify similar structural features or aspects of the subject disclosure. For purposes of explanation and illustration, and not limitation, a schematic view of an exemplary embodiment of the liquid level measurement system in accordance with the disclosure is shown in FIG. 1 and is designated generally by reference character 100. Other embodiments of the liquid level measurement systems and methods in accordance with the disclosure, or aspects thereof, are provided in FIGS. 2-10 and will be described. The systems and methods described herein can be used to provide non-invasive guided wave (GW) sensing systems with intrinsic safety.

Figure 2:
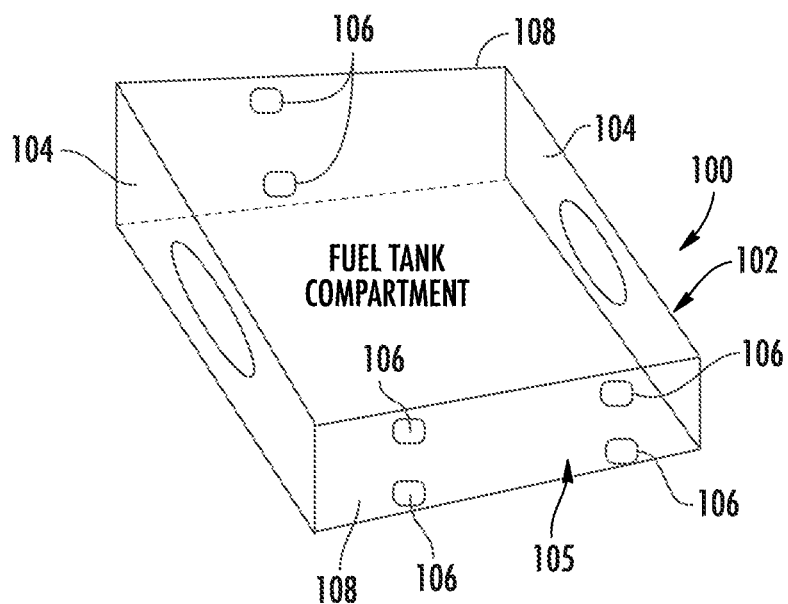
FIG. 2 is a schematic depiction of a portion of the jet fuel tank assembly of FIG. 1, showing first and second guided wave sensor arrays.
Figure 3:
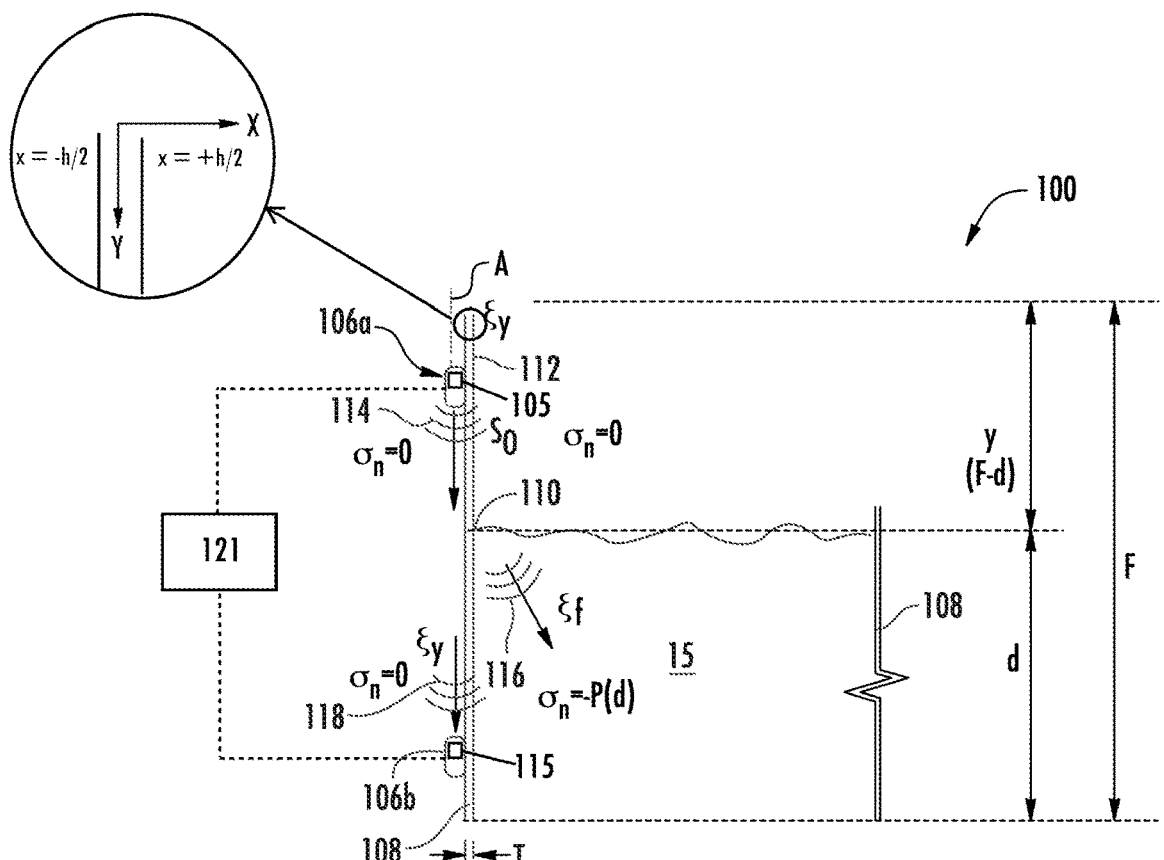
FIG. 3 is a schematic depiction of another embodiment of a jet fuel tank assembly having a jet fuel level measurement system constructed in accordance with embodiments of the present disclosure, showing transmitted guided waves, point-to-point transmitted guided waves and refracted guided waves.

As shown in FIGS. 1-3, a system 100 for determining liquid level of a liquid, e.g., jet fuel, in a container includes liquid container 102, e.g., fuel compartments 102, as part of a fuel tank assembly 10. It is contemplated that system 100 and methods 600, 700, 800 described herein can be used for a variety of types of jet fuels, e.g., Jet-A, Jet A1, Jet-B, and the like. Detection of the liquid level of fuel tanks is critical for aerospace fuel sensing applications. Fuel compartments 102 can be constructed of an aluminum alloy material, composite material or other similar material. Fuel compartments 102 are bounded by common side walls 104 and exterior walls 108.

The system can include one or more guided wave ("GW") sensors 106, e.g. a piezoelectric transducer, or the like, operatively coupled to the liquid container 102 configured to emit and detect one or more guided waves within the liquid container 102 which may be subject to different forms of attenuation by the liquid volume. In embodiments, the one or more GW sensors 106 are operatively coupled to an exterior (e.g., exterior walls 108) of the liquid container 102. In such embodiments, when GW sensor arrays 106 are located outside of compartments 102, the system 100 can be made intrinsically safe, because no energy is injected into the tank. Additionally, the non-invasive nature of ultrasonic guided-wave detection of an internal liquid level based on external GW sensors is a reliability improvement over traditional internally mounted liquid level sensors since it is intrinsically safe and it is not subject to the clogging conditions or the corrosiveness associated with the usage of traditional jet fuels. Each guided wave sensor array 106 can be configured and adapted to emit guided waves 114, i.e. to generate an initial induced guided wave using an transmitter portion 105 of sensor array 106 to spawn transmitted waves 118. Each guided wave sensor array is also configured and adapted to receive, i.e. sense, guided waves with a receiver portion 115. Once the waves have been emitted/induced, they are considered emitted guided waves 114. The GW sensors 106 can be arranged relative to one another to emit and detect the guided waves in a pitch-catch fashion and/or a pulse-echo fashion.

Once emitted, the guided waves undergo attenuation that differentiates them from the initial induced guided waves generated by sensors 106. Once attenuated, the guided waves are considered transmitted waves, e.g. 118, 218. The symmetrical, $S_0$, waves can be induced in the exterior wall 108 of the jet fuel compartment 102. These $S_0$ guided waves travel through the thickness T of the exterior wall 108 and can recognize the jet fuel surface boundary 110 at the interior surface 112 of the wall 108. The $S_0$ guided waves are dispersed differently based on the loading on the interior surface 112 of the jet fuel compartment 102.

With continued reference to FIGS. 1-4, guided waves are emitted from a first GW senor array 106a (shown in FIG. 3) and generate transmitted waves 118 that may be detected (read) by a second GW sensor array 106b or different sensor arrays, e.g. a "pitch-catch" setting. In this way, it is possible to sense the boundary conditions between the liquid volume and gas volumes in the liquid compartment 102 though monitoring the emergence, and/or both transmissive and reflected attenuation (or lack thereof) of different GW modes and therefore, therefore the fuel quantity can be deduced. For example, the sensor arrays 106, 206 can be operatively connected to a controller 121, which may include, among other things, a processor, configured to acquire and store sensor data from the sensor array 106, 206, as will be described further below. The controller 121 and/or a processor can be configured to perform one or more methods for determining the liquid level within the liquid container 102 based on the sensor data. The sensor data can include an attenuation amount of the one or more detected guided waves 116, 118, 216, 218 and/or a new wave mode of the one or more detected guided waves 116, 118, 216, 218, as explained further herein.

With continued reference to FIGS. 1-3, the second GW sensor array 106b is coupled to the exterior wall 108 and spaced apart from the first GW sensor array 106a. The first GW sensor array 106a defines a longitudinal emissions axis A. The second GW sensor array 106b is aligned along the longitudinal emissions axis A with and spaced apart from the first GW sensor array 106a along the longitudinal emissions axis A. The second GW sensor array 106b is configured and adapted to detect point-to-point transmitted guided waves 118, or other attenuated wave, from GW sensor array 106a. When using two or more GW sensor arrays 106a and 106b in a pitch-catch setting, the non-sourcing GW sensor array, in this case GW sensor array 106b, detects the point-to-point transmitted guided waves 118 from GW sensor array 106a. The energy received in GW sensor array 106b from transmitted guided waves 118 is related to the fuel level. The larger and more dispersed the refracted waves are, the smaller the transmitted waves 118 to GW sensor array 106b. This also means that the fuel level is correlated to the transmitted wave energy and resultant wave properties thereof.

With continued reference to FIGS. 1-3 and 6, the $S_0$ emitted guided waves 114 propagate through the tank wall 112 at a very high speed (in the order of thousands mph). FIG. 3 schematically shows interactions between the $S_0$ waves and the jet fuel boundary. The $S_0$ waves can recognize the jet fuel boundary 110 and undergo changes, e.g. attenuation, as they encounter the jet fuel boundary, e.g. refraction, reflection, new wave mode condition. Mode conversion occurs along the solid-liquid interface of the interior surface 112 of the wall 108 and liquid 15. A portion of the $S_0$ wave is being mode converted into pressure waves (P-waves), e.g. refracted waves 116, and they travel through the jet fuel 15 at a pressure wave speed. The P-waves are refracted into the liquid fuel. Hence, transmitted $S_0$ waves lose some energy along the tank boundary 110 where the fuel is in contact with the fuel tank. This energy leakage is related to the fuel level in the compartment 102. The higher the fuel level, larger the energy leakage. In some embodiments, $S_0$ waves (emitted guided waves 114) are transmitted through the tank wall 108.

Figure 4:
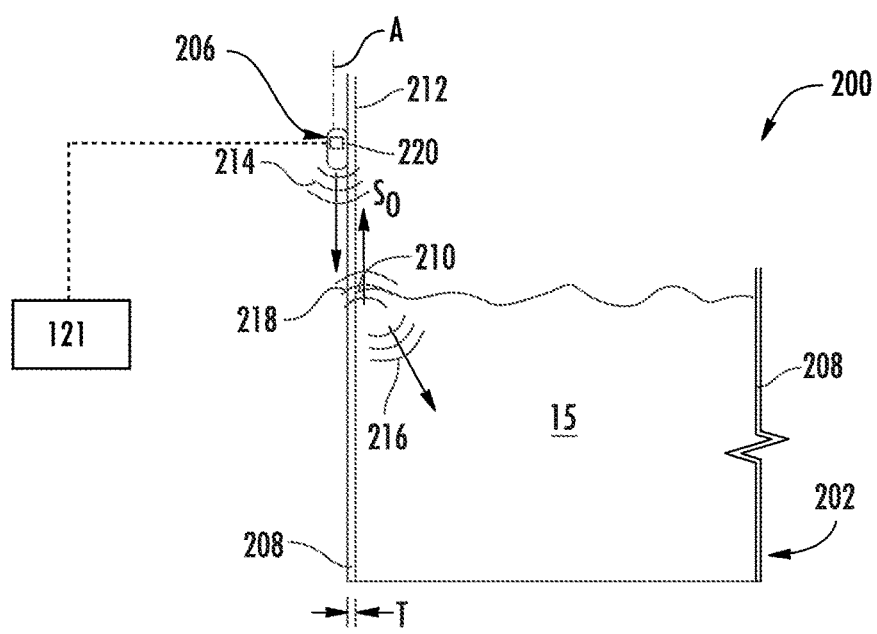
FIG. 4 is a schematic depiction of another embodiment of a jet fuel tank assembly having a jet fuel level measurement system constructed in accordance with embodiments of the present disclosure, showing transmitted guided waves, reflected guided waves and refracted guided waves.

As shown in FIG. 4, another embodiment of a liquid level measurement system 200 includes a jet fuel compartment 202 bounded by exterior walls 208. Liquid level measurement system 200 is similar to system 100 except that a guided wave sensor array 206 operates independently from the other sensor arrays in system 200. Liquid level measurement system 200 can be used in conjunction with system 100 as part of the same fuel tank assembly 10. System 200 is configured to measure the fuel level using standalone guided wave sensor array 206. Guided wave sensor array 206 is set on a pulse-echo setting. GW wave sensor array 206 is configured and adapted to emit guided waves 214 and generate transmitted guided waves 210, 214, 216 (the same waves $S_0$ described above in the context of system 100) similar to GW sensor array 106a. These transmitted guided waves 214, 218 travel through the thickness T of the exterior wall 208, similar to that described above for wall 108. A portion of the $S_0$ waves are refracted causing refracted guided waves 216 into the jet fuel 15, another portion of the $S_0$ waves are reflected back causing reflected guided waves 218.

With continued reference to FIG. 4, the reflected guided wave 218 propagates through the exterior wall 208 and comes back to the sourcing GW sensor array 206. GW sensor array 206 contains sensing elements which can pick up the reflected guided waves 218. GW sensor array 206 includes a timing element 220. The timing element 220 is configured to measure a time of flight (TOF) for an emitted guided wave 214 to return as a reflected guided wave 218. The TOF of the reflected waves 218 can be correlated to the empty height of the fuel tank. From the empty height, the jet fuel level in compartment 202 can be deduced. In this way, GW sensor array 206 is used to measure the aircraft fuel quantity (both volume and mass).

Figure 5:
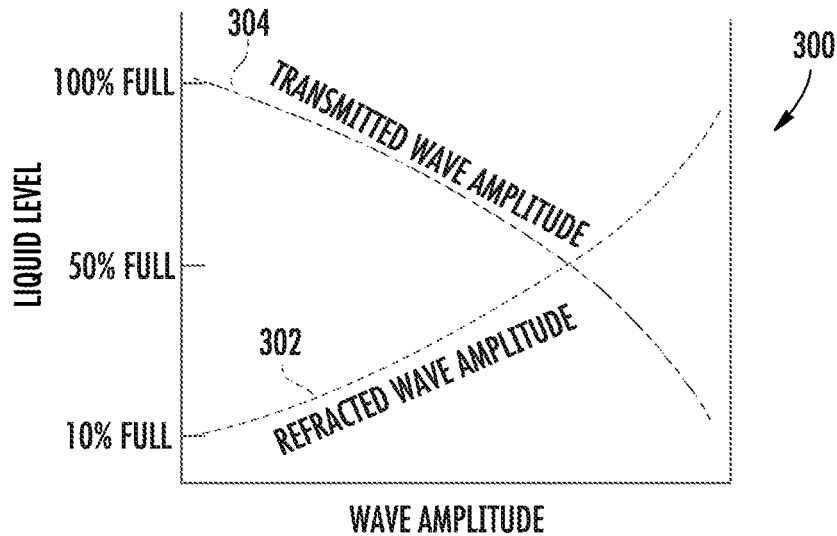
FIG. 5 is a schematic depiction of a determination chart constructed in accordance with embodiments of the present disclosure, showing the correlation between the transmitted and refracted wave amplitudes versus the jet fuel level.

With reference now to FIG. 5, a general trend of the relationship between mode conversion of transmitted guided waves $S_0$, e.g. transmitted guided waves 118, or 218, and liquid level is illustrated by chart 300. The liquid fuel level in a given compartment, e.g., compartments 102, or 202, affects the mode conversion of $S_0$ waves. As such, a relationship can be obtained between the liquid fuel level and the mode converted waves. Trend line 302 shows the relationship between refracted wave amplitude, e.g. amplitude of refracted waves 116 or 216. As the liquid fuel level rises, the amplitude of the refracted waves increases. The relationship may not be linear because of the complex nature of the wave mode conversion at the solid-liquid interface, e.g., surface boundary 110 or 210. In certain embodiments, detecting the point-to-point transmitted wave energy detected by a second guided wave sensor array, the amount of refracted wave energy can be inferred. As the refracted wave energy is essentially a loss in the liquid fuel, the transmitted wave energy detected by second guided wave sensor array, e.g., second GW sensor array 106b, is also affected by that energy loss. The general trend of the transmitted waves, shown by trend line 304, is opposite of the refracted waves. As the liquid level increases, the amplitude of the transmitted waves decreases. The general trend of the transmitted wave is also non-linear because of the complex nature of the wave mode conversion.

Figure 6:
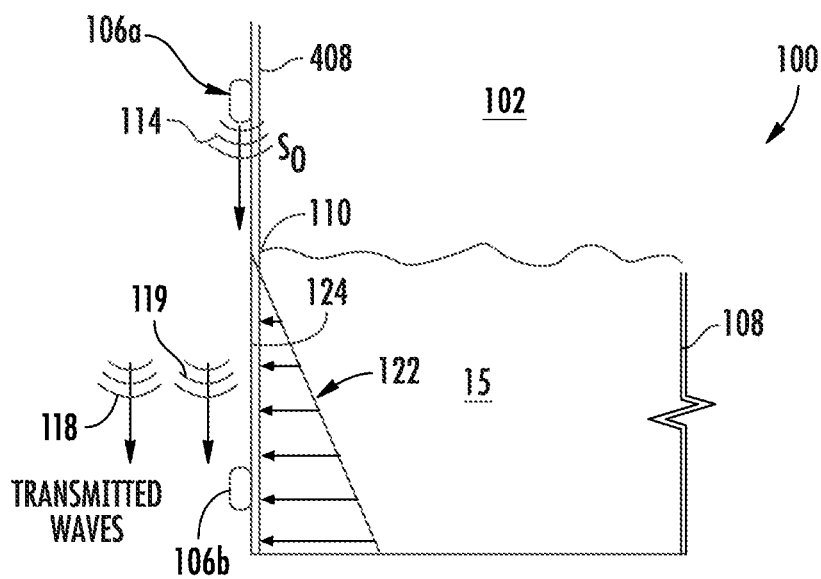
FIG. 6 is a schematic depiction of another embodiment of a jet fuel tank assembly having a jet fuel level measurement system constructed in accordance with embodiments of the present disclosure, showing transmitted guided waves and new mode of guided wave.
Figure 7:
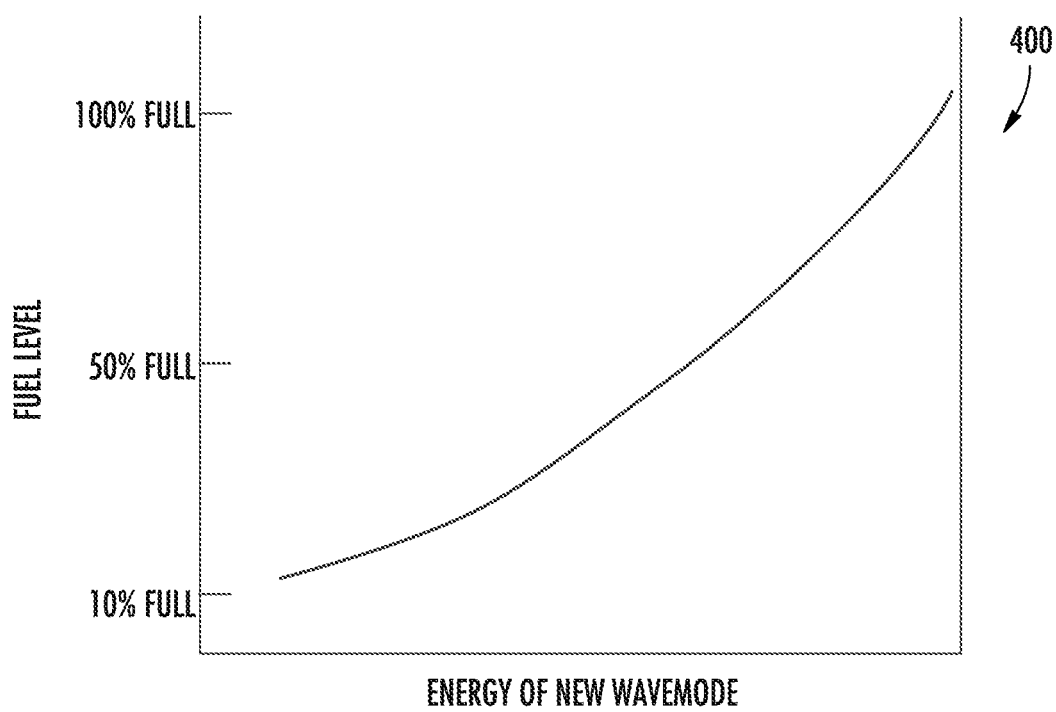
FIG. 7 is a graphical depiction of a determination chart constructed in accordance with embodiments of the present disclosure, showing the correlation between the energy of the detected new wave mode of the guided wave versus the jet fuel level.

As shown in FIG. 6, the hydrostatic pressure of the liquid fuel, or other liquid, in compartment 102 of liquid level measurement system 100 increases at a given position in the compartment 102 as the liquid level rises. The hydrostatic pressure disrupts the free boundary conditions at the inner boundary 124 of the tank wall 108 with liquid 15. The new hydrostatic pressure boundary condition at the inner surface 124 of the wall 108 may initiate a new wave mode condition 119 along the tank wall 108. As the fuel level rises, the hydrostatic pressure at a given point along inner surface 124 increases with increasing fuel depth, shown schematically by progressively lengthening arrows 124, which may cause a stronger new wave mode 119. The energy of the new wave mode 119 is also related to the hydrostatic pressure, hence, correlating to the fuel level. It is expected that the energy of the new wave mode condition 119 should increase non-linearly as the fuel level rises. A general trend of the relationship between the fuel level and the new wave energy is illustrated in chart 400 of FIG. 7.

As discussed above, the controller 121 can be connected to the GW sensor array 106, 206 (e.g., as shown in FIGS. 3 and 4). The controller 121 can include machine readable instructions operative to acquire and store sensor data, and perform one or more methods and/or calculations to determine the liquid level in the container 102 using the sensor date. In embodiments, the controller 121 can be or include both hard wired circuits that cause a logic to be executed, and/or software-based components, for example, simple electric circuits employing analogue components, or the controller 121 can include a CPU, a memory, machine readable instructions in the memory that when executed cause the CPU to perform a method (e.g. as described below with respect to methods 600, 700, and/or 800). The computer readable instructions can include software developed using modeling or empirical data. In embodiments, the controller 121 can be configured to use one or more algorithms in any of methods 600, 700, 800. The algorithm can be constructed using the functionality as described above in addition to known general engineering principles as applied to the specific characteristics of each particular sensor system and method to which the technology of the present disclosure is applied.

Figure 8:
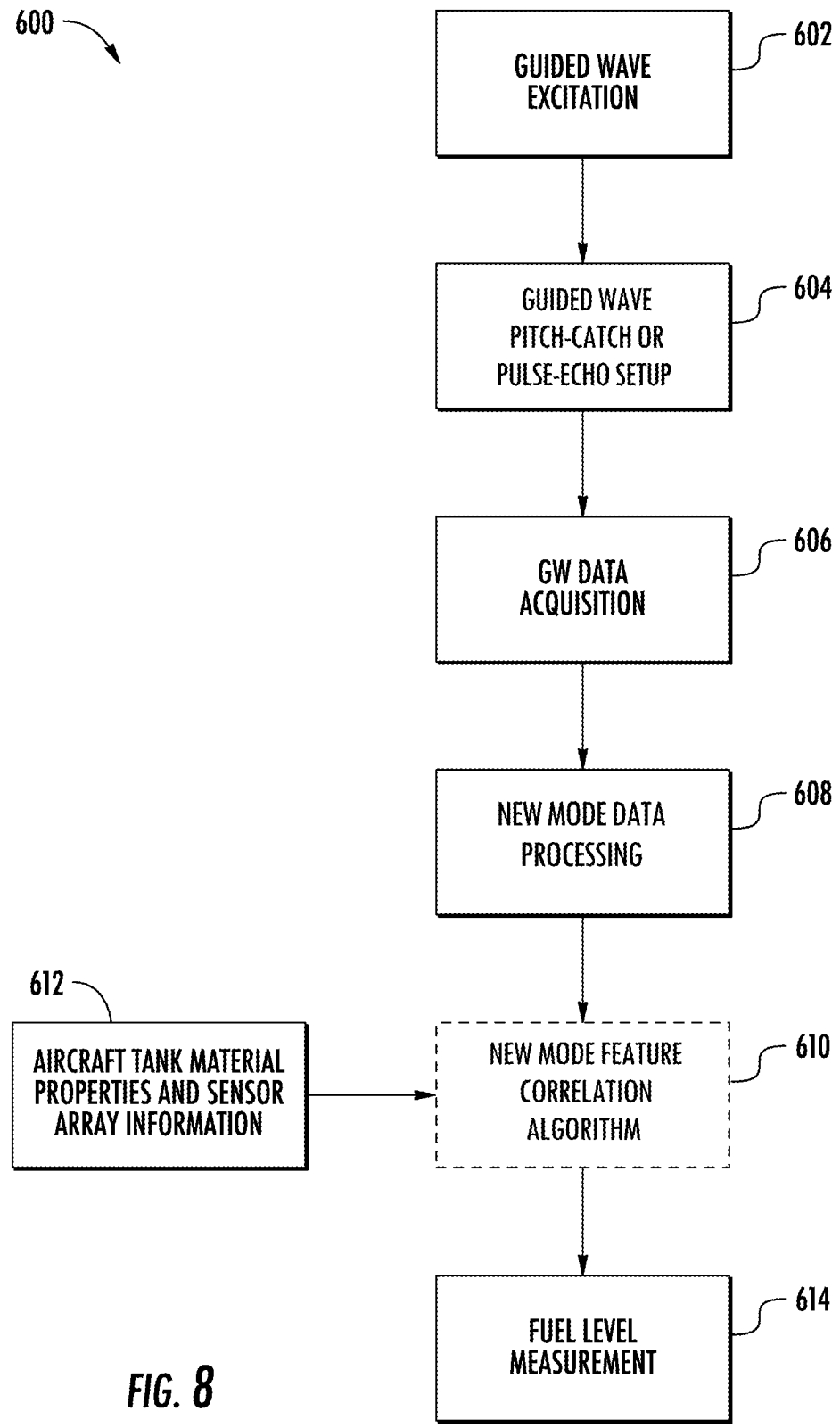
FIG. 8 is a depiction of a flow chart showing a method to quantify the jet fuel level.
Figure 9:
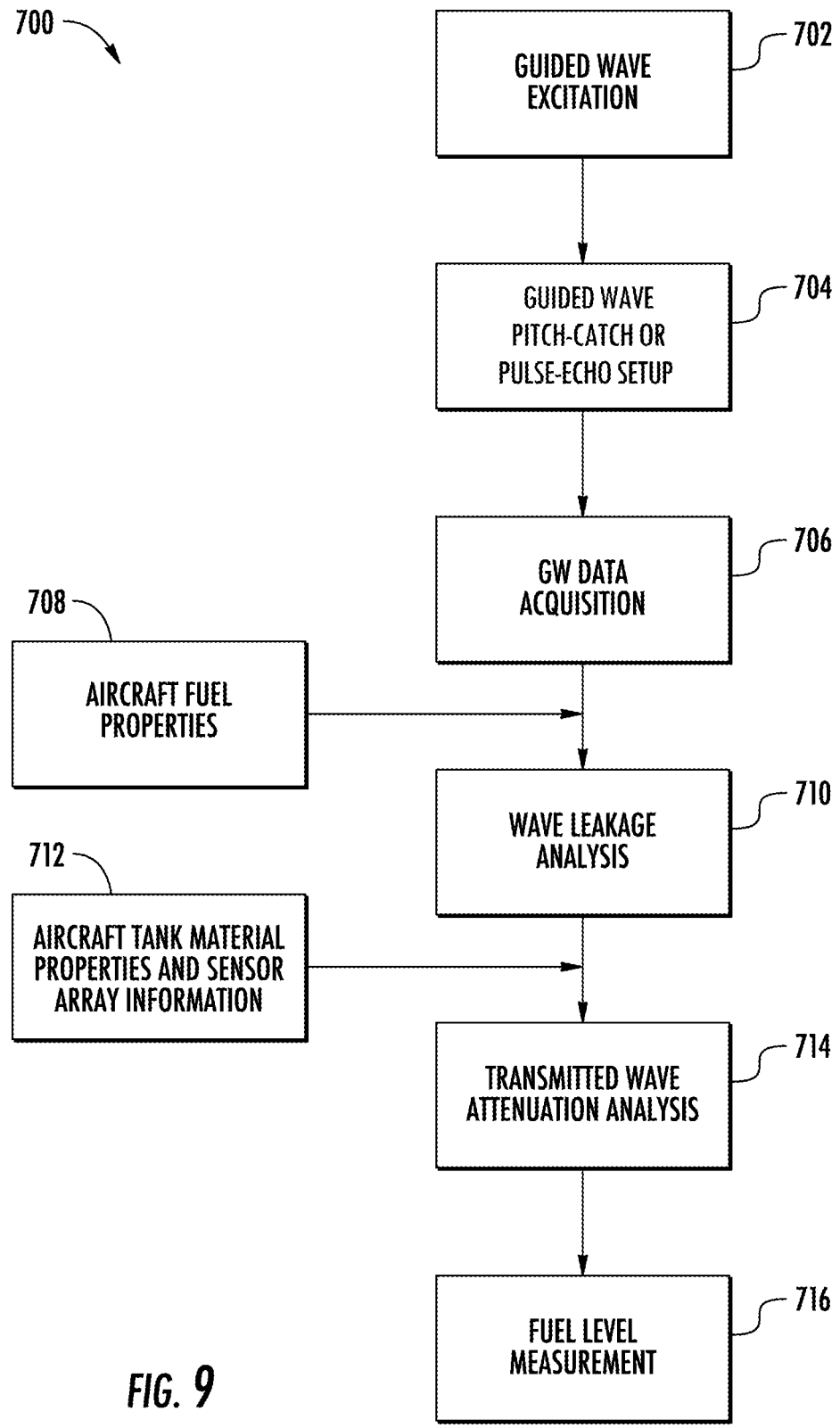
FIG. 9 is a depiction of a flow chart showing another method to quantify the jet fuel level.

In accordance with at least one aspect of this disclosure, as shown in FIG. 8, a method 600 for measuring the liquid level in the liquid container 102 can include, at box 602, emitting one or more guided waves (e.g., generating transmitted waves 116, 216) from a guided wave sensor array (e.g., sensor array 106a, 206) coupled to the liquid container through a liquid volume within the liquid container. The method 600 can include at box 604 detecting the one or more transmitted guided waves (e.g., detected waves 118, 218, 119) with at least one of the guided wave sensor arrays (e.g., sensor 206) or a second guided wave sensor array (e.g., 106b), and at box 606, acquiring and storing sensor data.

The method 600 can further include, a box 608, deriving a new mode condition of the one or more detected guided waves, where the liquid level of the liquid container can be deduced based at least in part on the new mode condition for the one or more detected guided waves, as will become clear. Still with reference to box 608, deriving the new mode condition can include, first, calculating a structural guided wave potential for one or more waves $\varphi$, $\psi$ of the one or more detected guided waves (e.g. P-waves), represented by $\varphi=\varphi(x)e^{i(\xi_y y-\omega t)}$ and $\psi=\psi(x)e^{i(\xi_y y-\omega t)}$, where $\xi_y$ is the wavenumber along the wave propagation direction y, t is the time, x is along the thickness of the structure.

A pressure wave potential $\varphi_f$ of the liquid in the liquid container at a given liquid level, e.g., a level between a full level and an empty level, can be calculated using $\varphi_f = Ce^{i\xi_x x}e^{i(\xi_y y-\omega t)}$, where C is a constant for pressure wave potential. As used herein, a "full level" may not necessarily require that liquid container be at capacity, or filled such that no air gap exists between the top of the container and the top of the liquid. A "full level" may be any level above empty which can be considered to be equivalent to full, though an air gap does exist between the top of the liquid container and a top of the liquid. The pressure wave potential equation can be generalized using Snell's Law, where $\xi_{yf}=\xi_y$, to derive a pressure potential in the liquid at any level, as represented by $\varphi_f = Ce^{i\xi_x x} e^{i(\xi_y y - \omega t)}$. Next, deriving the new mode condition can include calculating a wave number of one or more of the one or more detected guided waves using the equation $$\xi_f = \sqrt{\xi_x^2 + \xi_y^2}.$$

Deriving the new mode condition can further include, calculating one or more stress fields to derive one or more boundary conditions, for example by correlating the wave number with a circular frequency and pressure wave speed of the one or more detected waves at the given liquid level using $$\xi_f = \frac{\omega}{c_f}$$

and deriving a stress condition $\sigma_n$ for the empty level and for the given liquid level between the full level and the empty level. The circular frequency ($\omega = 2\pi f$) can be deduced from the frequency (f) in Hz.

The one or more boundary conditions can include for the empty level $\sigma_n = 0$, at $$x = \pm \frac{h}{2}$$

and y<(F−d); and for the given liquid level between the full level and the empty level $\sigma_n = 0$, at $$x = -\frac{h}{2}$$

and y<F; $\sigma_n = 0$, at $$x = +\frac{h}{2}$$

and y<(F−d); $\sigma_n = -P(d)$, at $$x = +\frac{h}{2}$$

and y>(F−d), where $\sigma_n$ is normal stress, F is the total depth of the liquid at the full level, d is the liquid level, P(d) is hydrostatic pressure of the liquid in the container, and h is the thickness of the container wall. Once the boundary conditions have been established and solved numerically, the new mode characteristic is known.

Still with reference to box 608, the method can further include generating a dispersion plot for one or more of the detected waves in the new mode condition to determine a phase velocity and a group velocity of the one or more waves in the new mode condition. Using the dispersion plot, the method can include, at box 610, correlating an amplitude of the one or more detected guided waves in the new mode condition to an amplitude of the one or more detected guided waves as detected by the one or more sensor arrays (e.g., from box 612, where relationship between amplitude and liquid level in the new mode condition is defined in FIG. 5). From this, the liquid level of the liquid container can be deduced and the fuel mass can be mathematically obtained by using this method, at box 614.

In certain embodiments, a method 700 for measuring the liquid level in the liquid container 102 can include, at box 702, emitting one or more guided waves (e.g., transmitted waves 116, 216) from a guided wave sensor array (e.g., sensor array 106) coupled to a liquid container through a liquid volume within the liquid container. The method 700 can include at box 704 detecting the one or more guided waves (e.g., detected waves 118, 218) with at least one of the guided wave sensor array (e.g., sensor 206) or a second guided wave sensor array (e.g., 106b), and at box 706, acquiring and storing sensor data.

At box 710, the method can include performing an energy leakage analysis on the one or more detected guided waves using known properties of the liquid within the container from box 708. At box 714, the method can further include, determining an attenuation amount using attenuation analysis of the one or more detected guided waves between the one or more guided wave sensor arrays. From here, at box 716, determining the liquid level in the liquid container can be determined by correlating the amount of attenuation of the one or more detected guided waves to a liquid level. Thus, the liquid level in the liquid container can be deduced and the fuel mass (i.e. quantity or level) can be mathematically obtained by using this method, at box 716.

Figure 10:
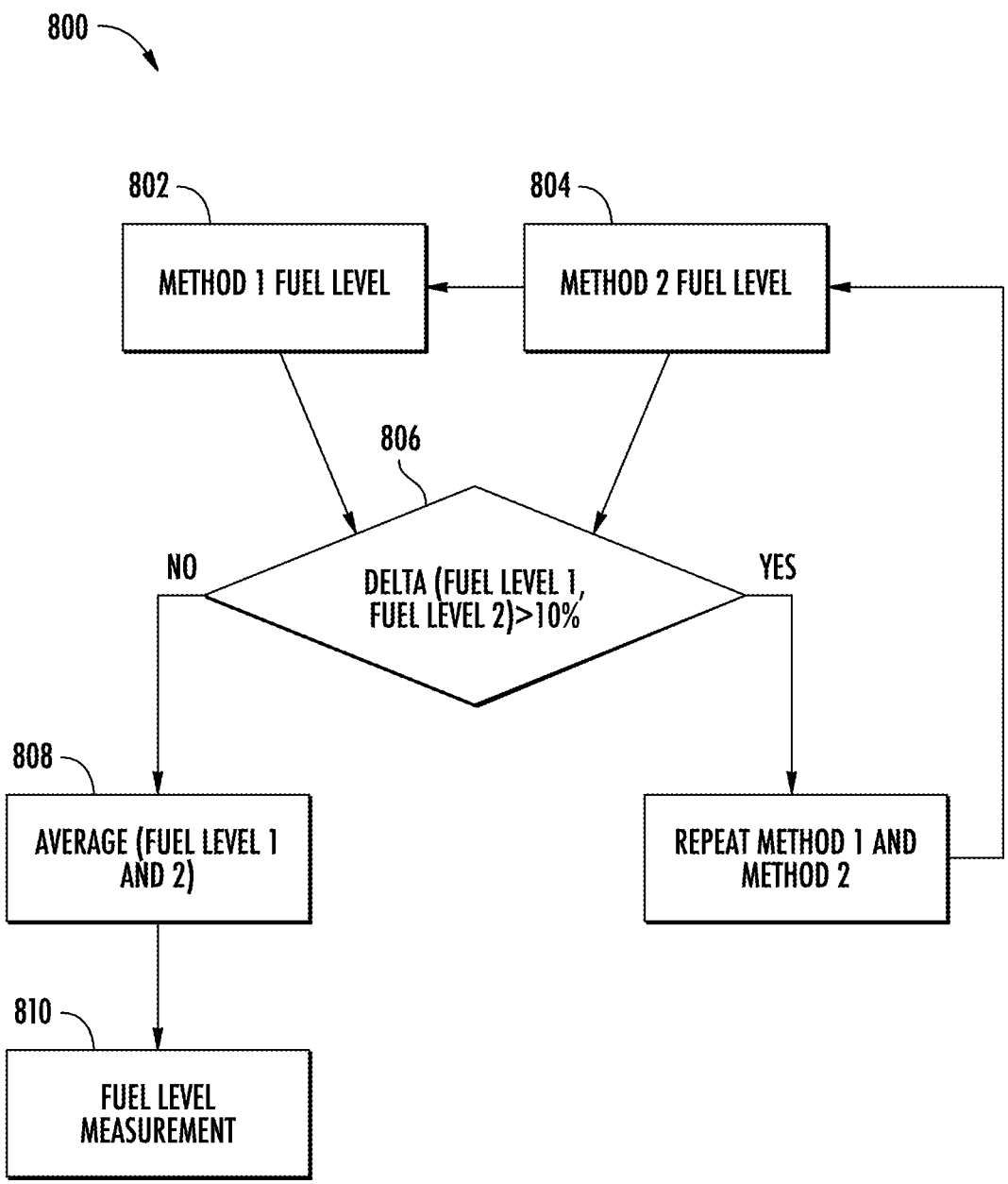
FIG. 10 is a depiction of a flow chart showing another method to quantify the jet fuel level.

In certain embodiments, as shown in FIG. 10, a method 800 for determining the liquid level of the liquid container can include performing at box 802 the method 600 to determine a first liquid level measurement and performing at box 804 the method 700 to determine a second liquid level measurement. At box 806, method 800 can include comparing the first measurement to the second measurement to determine a measurement delta. The measurement delta can be a calculated percent difference between the first measurement and the second measurement. Still with reference to box 806, the method includes comparing the measurement delta to a predetermined threshold. If the percent difference between the first measurement and the second measurement is greater than a predetermined threshold (e.g., about 10%), the method 800 further includes recalculating the first measurement and the second measurement, by repeating the method 600 and method 700 at boxes 802, 804. If the measurement delta is less than or equal to the predetermined threshold, the method 800 can include, at box 808, averaging the first measurement and the second measurement. The averaged liquid level measurement can then be used as the actual liquid level measurement. With continued reference to box 808, the averaging operation may also contain weighted average of measurements based on data quality or measure of confidence assessments. From this, the liquid level of the liquid container can be deduced and the fuel mass can be mathematically obtained by using this method, at box 810.

The non-invasive approach of fuel quantity measurement as disclosed herein, compared to traditional jet fuel level measurement systems with ultrasonic emitters and receivers within the liquid compartment, is inherently advantageous because the GW sensor arrays (e.g., 106, 206) do not encounter the hazards associated with the fuel (e.g., corrosiveness, flammability), nor the environmental severity (e.g. cryogenic temperatures) that could reduce sensor reliability. Additionally, the $S_0$ waves can be less dispersive by nature, and at very low frequency, may act like axial waves. This means the wave packets can preserve their shape as they travel long distance, which can be advantageous for data processing, such as when deriving the new wave mode condition and performing attenuation analysis, for example.

While shown in the context of aircraft fuel compartments and the like, embodiments of the systems and methods described herein are applicable for any ultrasonic guided wave devices used for aircraft liquid measurement. For example, systems and methods described herein can be used in potable water storage and/or fuel quantity sensing for cryogenic liquid hydrogen tanks for aerospace vehicles. It is also contemplated that systems and methods may also be applied to other types of receptacles, such as ground based fuel tanks, fuel tubes, pipelines, and other conduits to determine liquid levels. In addition, the methods can also be extended to use for potable water receptacles or any other similar liquid (similar density) as long as the water (and/or liquid) receptacle (vessel, compartment, or the like) is made of same or similar material as the aircraft fuel tank.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "controller," or "system." A "circuit," "module," "controller," or "system" can include one or more portions of one or more separate physical hardware and/or software components that can together perform the disclosed function of the "circuit," "module," "controller," or "system", or a "circuit," "module," "controller," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method for measuring a liquid level in a liquid container, comprising:
    emitting one or more guided waves from a guided wave sensor array through a liquid volume within a liquid container, the guided wave sensor array coupled to the liquid container;
    detecting one or more guided waves with at least one guided wave sensor array or by a second guided wave sensor array;
    determining a liquid level of the liquid container using one or more detected guided waves,
    deriving a new mode condition of the one or more detected guided waves, wherein determining includes determining the liquid level of the liquid container based at least in part on the new mode condition for the one or more detected guided waves.

2. The method of claim 1, further comprising:
    determining an attenuation amount of the one or more detected guided waves between the one or more guided wave sensor arrays.

3. The method of claim 2, wherein determining includes correlating the attenuation amount of the one or more detected guided waves to a liquid level to determine the liquid level of the liquid container.

4. The method of claim 1, wherein deriving the new mode condition further includes:
    calculating a structural guided wave potential for one or more waves $\varphi, \psi$ of the one or more detected guided waves, represented by $\varphi = \varphi(x)e^{i(\xi_y y - \omega t)}$ and $\psi = \psi(x)e^{i(\xi_y y - \omega t)}$.

5. The method of claim 4, wherein deriving the new mode condition further includes:
    calculating a pressure wave potential $\varphi_f$ of the liquid in the liquid container at a given liquid level between a full level and an empty level, represented by $\varphi_f = Ce^{i\xi_x x}e^{i(\xi_y y - \omega t)}$ where C is a constant for pressure wave potential; and
    generalizing the pressure wave potential to derive a pressure potential in the liquid, represented by $\varphi_f = Ce^{i\xi_x x}e^{i(\xi_y y - \omega t)}$.

6. The method of claim 5, wherein deriving the new mode condition further includes:
    calculating a wave number of one or more of the one or more detected guided waves, represented by $$\xi_f = \sqrt{\xi_x^2 + \xi_y^2}.$$

7. The method of claim 5, wherein deriving the new mode condition further includes: calculating one or more stress fields to derive one or more boundary conditions, wherein calculating includes:
    correlating the wave number with a circular frequency and pressure wave speed of the one or more detected waves at the given liquid level, represented by $$\xi_f = +\frac{\omega}{c_f},$$

where $\omega$ is a circular frequency of the one or more detected guided waves and is deduced from a frequency of the one or more detected guided waves; and
    deriving a stress condition $\sigma_n$ for the empty level and for the given liquid level between the full level and the empty level.

8. The method of claim 7, wherein the one or more boundary conditions include:
    for the empty level:
    $\sigma_n = 0$, at $$x = \pm \frac{h}{2}$$

and y<(F−d); and
    for the given liquid level between the full level and the empty level:
    $\sigma = 0$, at $$x = -\frac{h}{2}$$

and y<F
σ=0, at $$x = +\frac{h}{2}$$

y<(F−d)
$\sigma_n$=−P(d), at $$x = +\frac{h}{2}$$

and y>(F−d),
wherein $\sigma_n$ is normal stress, F is the total depth of the liquid at the full level, d is the liquid level, P(d) is hydrostatic pressure of the liquid in the container, and h is the thickness of the container wall.

9. The method of claim 8, wherein determining the liquid level of the liquid container further includes:
generating a dispersion plot for one or more of the detected waves in the new mode condition to determine a phase velocity and a group velocity of the one or more waves in the new mode condition.

10. The method of claim 9, wherein determining the liquid level of the liquid container further includes:
correlating an amplitude of the one or more detected guided waves in the new mode condition to an amplitude of the one or more detected guided waves as detected by the one or more sensor arrays to determine a first measurement of the liquid level of the liquid container.

11. The method of claim 9, wherein determining the liquid level of the liquid container further includes:
determining an attenuation amount of the one or more detected guided waves between the one or more guided wave sensor arrays; and
correlating the attenuation amount of the one or more detected guided waves to a liquid level to determine a second liquid level measurement.

12. The method of claim 11, determining the liquid level of the liquid container further includes:
comparing the first measurement of the liquid level to the second measurement of the liquid level; and
calculating a percent difference between the first measurement and the second measurement.

13. The method of claim 12, determining the liquid level of the liquid container further includes:
if the percent difference between the first measurement and the second measurement is greater than a predetermined threshold, the method further includes recalculating the first measurement and the second measurement; or
if the percent difference between the first measurement and the second measurement is less than or equal to the predetermined threshold, determining the liquid level of the liquid in the liquid container further includes averaging the first measurement and the second measurement.

14. The method of claim 1, wherein emitting the one or more guided waves and detecting the one or more guided waves includes emitting and detecting in a pitch-catch manner and/or a pulse-echo manner.

15. A system for determining liquid level of a liquid container, comprising:
one or more guided wave sensors operatively coupled to the liquid container configured to emit and detect one or more guided waves with a liquid volume within the liquid container,
a controller operatively connected to the one or more guided wave sensors configured to receive sensor data from the one or more guided wave sensors and determine the liquid level of the container based at least in part on the sensor data;
wherein the one or more guided wave sensors includes a transmitter array and a receiver array, wherein the transmitter array and the receiver array are arranged in a pitch-catch and/or a phase echo arrangement relative to one another;
wherein the sensor data includes, an attenuation amount of the one or more detected guided waves between the transmitter array and the receiver array and a new wave mode condition of the one or more detected guided waves, wherein the controller is further configured to:
correlate an amplitude of the one or more detected guided waves in the new wave mode condition to an amplitude of the one or more detected guided waves in a non-new wave mode condition to determine a first liquid level measurement;
correlate the attenuation amount of the one or more detected guided waves in a non-new wave mode condition to a liquid level to determine a second liquid level measurement;
compare the first liquid level measurement to the second liquid level measurement;
calculate a percent difference between first measurement and the second measurement; and
if the percent difference between the first measurement and the second measurement is greater than a predetermined threshold, the controller is configured to recalculate the first measurement and the second measurement; or
if the percent difference between the first measurement and the second measurement is less than or equal to the predetermined threshold, the controller is configured to average the first measurement and the second measurement.

16. The system of claim 15, wherein the liquid container includes a fuel tank and the liquid includes liquid fuel.

17. A system for determining liquid level of a liquid container, comprising:
one or more guided wave sensors operatively coupled to the liquid container configured to emit and detect one or more guided waves with a liquid volume within the liquid container; and
a controller operatively connected to the one or more guided wave sensors configured to receive sensor data from the one or more guided wave sensors and determine the liquid level of the container based at least in part on the sensor data, wherein the sensor data includes, at least a new wave mode condition of the one or more detected guided waves.

18. The system of claim 17, wherein the senor data further includes an attenuation amount of the one or more detected guided waves between the transmitter array and the receiver array.

* * * * *